United States Patent [19]

Kato

[11] 4,064,860
[45] Dec. 27, 1977

[54] SPARK-IGNITION ENGINE FOR LEAN AIR-FUEL MIXTURE

[75] Inventor: Takashi Kato, Susono, Japan

[73] Assignee: Toyota Jidosha Kogyo Kabushiki Kaisha, Toyota, Japan

[21] Appl. No.: 645,814

[22] Filed: Dec. 31, 1975

[51] Int. Cl.² .................. F02B 19/12; F02B 19/18
[52] U.S. Cl. .................... 123/191 S; 123/32 K; 123/32 SP; 123/191 SP
[58] Field of Search ............ 123/32 SP, 32 SA, 32 K, 123/32 ST, 191 S, 191 SP, 32 C, 32 D, 75 B, DIG. 4

[56] References Cited

U.S. PATENT DOCUMENTS

| Re. 22,871 | 4/1947 | Starr | 123/32 SP |
| 2,086,427 | 7/1937 | Mock | 123/32 SA |
| 2,156,665 | 5/1939 | Mallory | 123/32 SP |
| 2,506,768 | 5/1950 | Bentz et al. | 123/32 SP |
| 2,924,210 | 2/1960 | Summers | 123/32 SP X |
| 3,102,521 | 9/1963 | Slehmons | 123/32 SP |
| 3,968,782 | 7/1976 | Noguchi et al. | 123/32 K X |
| 3,980,057 | 9/1976 | Sanda et al. | 123/32 SP X |

Primary Examiner—Charles J. Myhre
Assistant Examiner—Ira S. Lazarus
Attorney, Agent, or Firm—Blanchard, Flynn, Thiel, Boutell & Tanis

[57] ABSTRACT

A spark-ignition-type internal combustion engine having a main combustion chamber, an auxiliary combustion chamber, and a spark plug disposed in the passage interconnecting those chambers and wherein the spark plug is positioned in an enlarged portion of the passage.

11 Claims, 6 Drawing Figures

SPARK-IGNITION ENGINE FOR LEAN AIR-FUEL MIXTURE

This invention relates to an improvement in internal combustion engines of the type that have an auxiliary combustion chamber, to achieve better operation of the engines with lean air-fuel mixtures.

It is known to operate an internal combustion engine with a lean air-fuel mixture, in which the ratio of air to fuel is higher than the theoretical value, and that this is effective to decrease such detrimental exhaust gas components as CO (carbon monoxide), HC (hydrocarbons) and NOX (nitrogen oxides). But a lean air-fuel mixture, in general, is inferior in ignitability, and, when ignited, is slow to combust. Accordingly, a lean air-fuel mixture is apt to cause misfiring when used with an ordinary Otto-cycle internal combustion engine, and, even if it is ignited, the working efficiency (g/horse-power time) of the engine is greatly reduced because of its low combustion rate.

The stratified charge-type internal combustion engine having an auxiliary combustion chamber is an engine that overcomes the aforesaid shortcoming. In this engine, the combustion chamber comprises a main combustion chamber and a smaller auxiliary combustion chamber intercommunicated therewith by a passage. While a lean air-fuel mixture is introduced into the main combustion chamber, a rich air-fuel mixture that is easy to ignite, is formed in the auxiliary combustion chamber by means of a fuel injection valve or an auxiliary intake valve. The readily ignitable rich mixture in the auxiliary combustion chamber is first ignited by a spark plug disposed therein. Then, the combustion gas produced in the auxiliary combustion chamber is injected extensively into the main combustion chamber through said passage whereby the lean air-fuel mixture in the main combustion chamber is ignited and combusted quickly. This increases the combustion rate in the main combustion chamber, and thus prevents the above-mentioned decreases in the ignitability of the mixture and the engine efficiency. The development of this statified charge-type engine with such an auxiliary combustion chamber has advanced almost to the point that permits putting it into practical use. However, the use of two types of air-fuel mixtures, that is, lean and rich air-fuel mixtures, as described above, necessitates a very complex fuel supply system, which leads to such serious drawbacks as difficulties in manufacture, control and adjustment, increased cost and troublesome maintenance and inspection work. Consequently, an internal combustion engine that can use a lean air-fuel mixture, without requiring a rich mixture, has been desired earnestly.

The inventor discovered that a lean air-fuel mixture can be ignited directly, that is, without employing a rich air-fuel mixture, if the spark plug or other igniting device is improved suitably. Also it was discovered that, in an engine of the type that has no intake valve in its auxiliary combustion chamber, the waste gas that unavoidably remains in the auxiliary combustion exerts a serious adverse influence on the igniting performance of the lean air-fuel mixture therein. Based on these discoveries, the inventor previously proposed an engine that can be operated with a lean air-fuel mixture, in which the formation of a rich air-fuel mixture in the auxiliary combustion chamber is prevented by disposing the electrodes of the spark plug in the passage that intercommunicates the main combustion chamber and the auxiliary combustion chamber. In this engine, the waste gas, which remains in the passage at the igniting time immediately before the completion of the compression stroke, is moved into the auxiliary combustion chamber by the flow of the mixture forced from the main chamber into the auxiliary chamber during the course of the compression stroke. As a result, the waste gas is no longer present in the vicinity of the electrodes, thus improving ignitability of the air-fuel mixture.

However, the engine of the above-described type, wherein the electrodes of the spark plug are located in the intercommunicating passage, also is not free from problems. For example, the cross-section of the intercommunicating passage of this engine is made relatively small so as to provide the combustion gas with sufficient injection speed, in order that the effect of igniting and combusting the lean air-fuel mixture in the main chamber quickly, known as the torch effect, is achieved to a sufficient degree by causing the combustion gas in the auxiliary chamber to be injected powerfully into the extensive area of the main chamber. This reduction in the cross-sectional area of the passage, however, increases the speed of the mixture that flows through said passage, from the main chamber to the auxiliary chamber, at the time of ignition, and this is liable to blow off the electric arc discharge between the electrodes of the spark plug, resulting in misfiring. This problem apparently might be avoided by placing the spark plug electrodes in an area where the mixture flows at a lower speed, that is, in the neighborhood of the wall of the passage. But it has experimentally been proved that the placement of the electrodes near the passage wall lowers the ignitability even more. The cause for this lowering of ignitability has not been established clearly, but it seems to be possible that the flame core produced by the electric discharge is cooled down by the passage wall. At any rate, the idea of disposing the electrodes in the vicinity of the passage wall is not satisfactory.

The object of this invention is to provide an internal combustion engine adapted for use with a lean air-fuel mixture, in which the above-described problem experienced with the placement of the electrodes of the spark plug in the intercommunicating passage is solved.

This invention will be further described with reference to embodiments thereof shown in the accompanying drawings.

Referring to the drawings.

Figure 1:
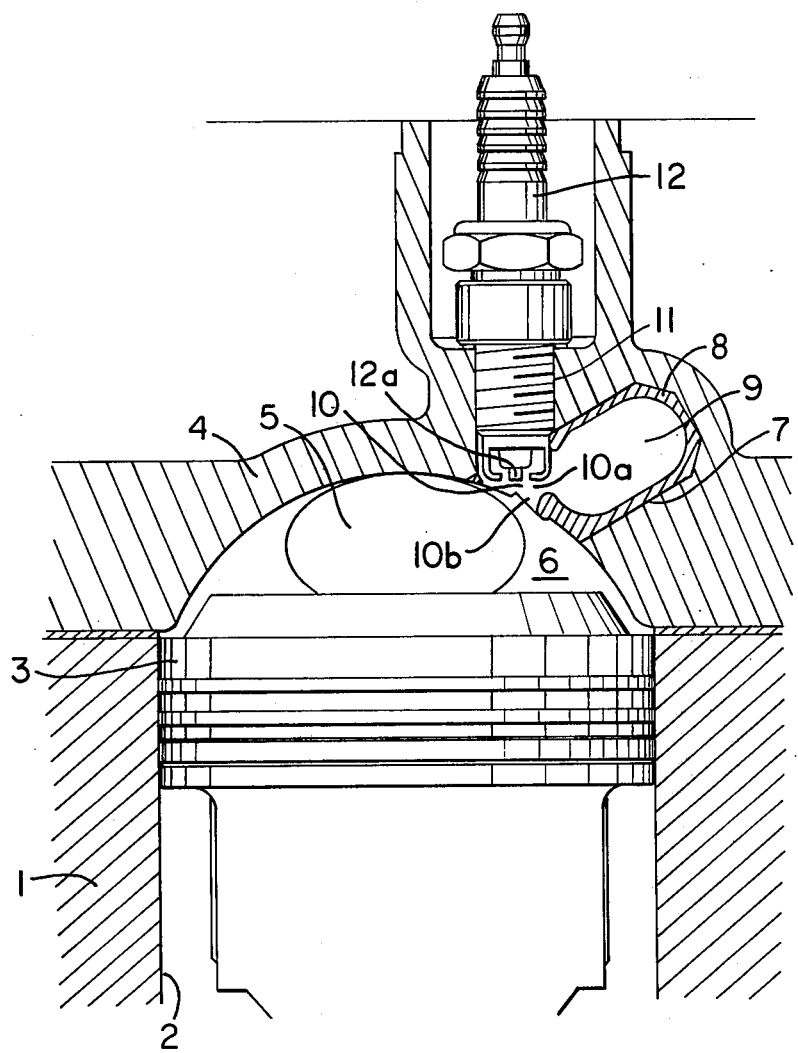
FIG. 1 is a cross-sectional view of a fragment of a spark-ignition-type internal combustion engine having an auxiliary combustion chamber and that embodies this invention.

Referring to FIG. 1, there is shown a fragment of an internal combustion engine comprising a cylinder block 1, a cylinder 2 formed therein, a reciprocatable piston 3 in the cylinder 2, and a cylinder head 4 mounted on the cylinder block 1. A main combustion chamber 6 is defined by the top surface of the piston 3 at the top-dead-center position thereof during the compression stroke and the internal surface of the cylinder head 4. The main combustion chamber 6 is provided with an intake valve 5 for introducing an air-fuel mixture and is also provided with an exhaust valve (not shown) in a known fashion. Near the top of the main combustion chamber 6 there is formed a recess 7 in the cylinder head 4, into which recess there is press-fitted an auxiliary combustion chamber shell 8, defining an auxiliary combustion chamber 9 and a passage 10 communicating said auxiliary combustion chamber 9 with the main combustion chamber 6. The reason why the auxiliary combustion chamber 9 is formed in the shell 8, which is a separate part from the cylinder head 4, is that the auxiliary chamber 9 whose inside is exposed to a very high temperature can be made of a material that has a higher heat resistance than the cylinder head 4. Also, the press-fitting method is adopted for the purpose of preventing over-heating of the auxiliary chamber shell 8 by improving heat transfer to the cylinder head 4. Further, an opening 11, that communicates the inside of the passage 10 with the outside of the cylinder head 4, is formed in both the auxiliary chamber shell 8 and the cylinder head 4, and a spark plug 12 is screwed therein. The electrodes 12a of the spark plug 12 are disposed in the vicinity of the center of said passage 10. As illustrated, the inside diameter of the passage 10 is larger at a portion 10a where the electrodes 12a are disposed than at a portion 10b that opens into the main combustion chamber 6. Briefly, the passage 10 has a larger cross-sectional area at the portion 10a than at the portion 10b.

Because the portion 10a has a larger cross-sectional area than the portion 10b, the air-fuel mixture or the combustion gas always flows at a slower rate in the former portion than in the latter. The portion 10b determines the speed at which the combustion gas is injected into the main combustion chamber 6, and therefore the extent of the torch effect. Even if the cross-sectional area of this portion 10b is reduced to attain an increased torch effect, the increase in the flow speed of the mixture, or the blow-off of the electric arc discharged between the electrodes 12a, may be prevented if the cross-sectional area of the portion 10a is made larger.

Figure 2:
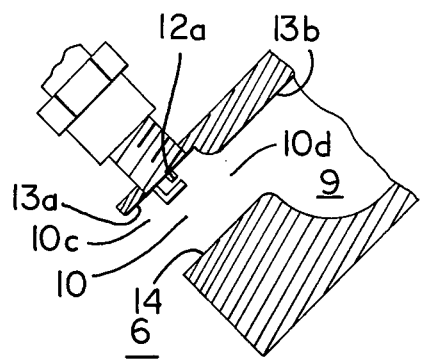
FIG. 2 is a cross-sectional view of the spark plug portion of another embodiment of this invention.

FIG. 2 shows an embodiment in which the electrodes of the spark plug 12 are disposed in an enlarged portion 10c of the passage 10, which enlarged portion is located adjacent to and communicates with the main combustion chamber 6. The passage 10 has a narrowed portion 10d whose cross-sectional area is smaller than said portion 10c and which is located adjacent to and communicating with the auxiliary combustion chamber 9. In this embodiment, the cross section of the enlarged passage portion 10c is expanded on one side thereof by laterally offsetting wall portion 13A from wall portion 13B. The opposing wall 14 is straight.

In the embodiment of FIG. 2, the enlarged passage portion 10d has a length along the flow direction of passage 10 which is greater than the outside diameter of the threaded portion of the spark plug. Thus, the gas velocity across the electrodes 12a is substantially reduced and the electrodes 12a of the spark plug 12 are prevented from being exposed to the swirl of air that occurs in the auxiliary combustion chamber 9.

Figure 3:
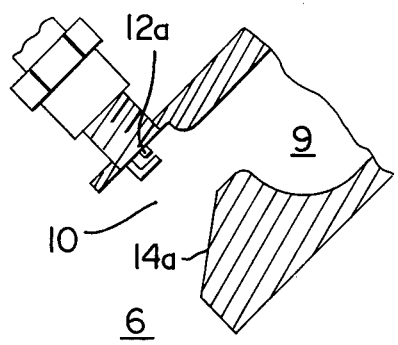
FIG. 3 is a cross-sectional view showing another embodiment of this invention in which part of the embodiment of FIG. 2 is improved.

FIG. 3 shows a modification of FIG. 2 in which the wall 14 has a tapered portion 14A adjacent to the main combustion chamber 6 and which tapers in a direction away therefrom toward the auxiliary combustion chamber 9.

In the embodiment of FIG. 3, the provision of a taper 14a permits a smooth supply of fuel-air mixture from the main combustion chamber 6 to the auxiliary combustion chamber 9. As a consequence, a sufficient amount of air-fuel mixture can be fed into the auxiliary combustion chamber 9. Further, this taper 14 not only determines the direction in which the torch flame is projected, but also increases the freedom with which the auxiliary combustion chamber shell 8 (see FIG. 1) can be fitted.

Figure 4:
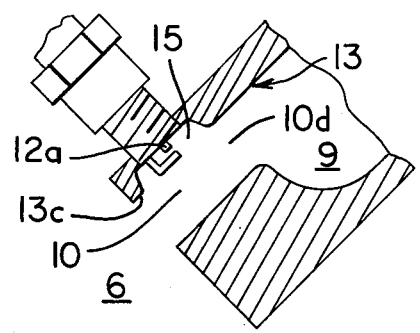
FIG. 4 is a cross-sectional view of a further embodiment of this invention.

FIG. 4 shows an embodiment in which a recess 15 is provided in the wall 13 of the passage 10, and the electrodes 12a are positioned in said recess 15. The recess 15 has a length along the flow direction of passage 10 which is greater than the outside diameter of the threaded portion of the spark plug. This results in the flow passage, in the vicinity of the recess 15, thus being of an enlarged crosssectional area, whereby the gasses which flow through this area and particularly those gasses which flow in the vicinity of the spark plug electrodes are thus moving at substantially reduced velocity.

In this embodiment, the air-fuel mixture in the vicinity of the electrodes 12a flows in a complex manner, which is considered to be due to a decrease in the flow velocity caused by the combined effects of an increase in the cross-sectional area of the passage 10 and the stagnation of flow in said recess. Despite such complicated flow, however, cooling of the electrodes 12a and blow-off of the spark are prevented, because the velocity of air-fuel mixture is reduced.

Figure 5:
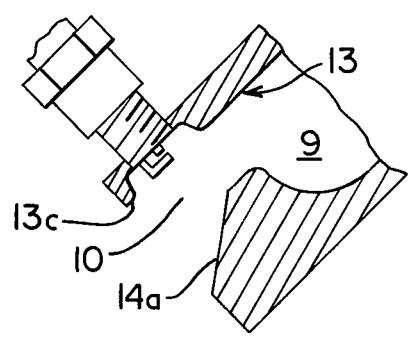
FIG. 5 is a cross-sectional view showing a still further embodiment of this invention in which part of the embodiment of FIG. 4 is improved.

In the embodiment shown in FIG. 5, a taper 14a is provided on the end of that portion of the passage 10 shown in FIG. 4 which is adjacent to the main combustion chamber 6.

As described above with respect to the embodiment of FIG. 3, this embodiment also permits supplying the air-fuel mixture into the auxiliary combustion chamber 9 smoothly.

Figure 6:
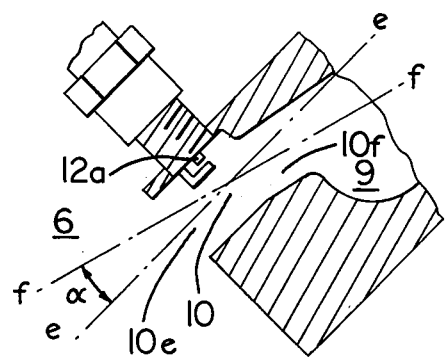
FIG. 6 is a cross-sectional view of yet another embodiment of this invention.

In the embodiment shown in FIG. 6, the passage 10 is defined by two passage portions which extend at an angle to each other. More particularly, the passage 10 has a passage portion 10e having a relatively large cross-sectional area located adjacent the main combustion chamber 6, and the passage 10 has a passage portion 10f having a relatively small cross-sectional area located adjacent the auxiliary combustion chamber 9. The angle $\alpha$ at which the center axes of the passage portions 10e and 10f intersect is selected to be as follows:

$$-90° < \alpha < 90°$$

Here, the electrodes 12a are provided in that side of the wall of the passage portion 10e that lies in the direction in which the center axis $f$—$f$ of the passage 10f is turned from the center exis $e$—$e$ of the passage portion 10e at said angle $\alpha$, that is, on the outside of the curve or bend.

In this embodiment, the air-fuel mixture urged into the auxiliary combustion chamber 9 changes flow direction or is deflected because the passage 10 is bent. Therefore, centrifugal force acts to bring a richer (heavier) portion of the air-fuel mixture close to the electrodes 12a, thereby facilitating ignition.

To reduce the noxious components of the exhaust gas from an engine of the above-described type, it is desirable to make the ratio of air to fuel high throughout all engine load conditions. But combustion of a lean air-fuel mixture is unavoidably accompanied by a drop in engine output or torque so it is desirable to lower the air-fuel ratio in the high-load region in which a high output is demanded, for example, during engine acceleration.

It is accordingly desirable to improve the responsiveness of the engine in the high-load region by controlling the air-fuel ratio to be at a high level in the medium (steady speed) and low load (idling) regions, and at a low level in the high load (acceleration) region.

The period of time during which the engine is operated under high load is small compared with the total operation time, and therefore an increase in exhaust emissions during such time is very small, too. So, the advantage offered by the improved responsiveness of the engine is greater than the disadvantage resulting from an increase in exhaust emissions.

Thus, this invention provides an internal combustion engine suited for use with a lean air-fuel mixture, which is simple in construction and capable of eliminating the previously described problem that has heretofore been unavoidable with the spark plug electrodes disposed in the intercommunicating passage.

The embodiments of the invention in which an exclusive property or privilege is claimed are defined as follows:

1. In a spark-ignition-type internal combustion engine having a main combustion chamber equipped with an intake valve for an air-fuel mixture, an auxiliary combustion chamber, a transfer passage interconnecting said main combustion chamber with said auxiliary combustion chamber, and a spark plug associated with the transfer passage, the spark plug having an annular threaded portion mounted in a wall defining the transfer passage so that the spark plug electrodes project into said passage, whereby the air-fuel mixture is forced during the compression stroke from the main combustion chamber into the auxiliary combustion chamber and is ignited by the spark plug electrodes, the combustion gas in the auxiliary combustion chamber is injected through said passage into the main combustion chamber, and thus the air-fuel mixture in the main combustion chamber is quickly ignited and combusted, comprising the improvement wherein said transfer passage has a first passage portion of enlarged cross-sectional area and at least one additional passage portion of a smaller cross-sectional area, said electrodes being positioned in said first portion of said transfer passage, and said first portion having a length as measured in the flow direction of the passage which is greater than the outside diameter of the threaded portion of the spark plug.

2. A spark-ignition-type internal combustion engine as set forth in claim 1, wherein the air-fuel mixture supplied to the main combustion chamber is lean when the engine load is medium and low, and is rich when the engine load is high.

3. A spark-ignition-type internal combustion engine as set forth in Claim 1, wherein the auxiliary combustion chamber is defined by an auxiliary combustion chamber shell which is press-fitted into a recess in the cylinder head from the main combustion chamber side.

4. A spark-ignition-type internal combustion engine as claimed in claim 1, in which said first portion of enlarged cross-sectional area is an intermediate portion of said passage, and said passage has end portions on opposite sides of said first portion, at least one of said end portions being of smaller cross-sectional area than said intermediate portion, the velocity of flow of the gas being reduced in said first portion of said passage adjacent said electrodes in an amount effective to avoid cooling of the electrodes and quenching of the spark.

5. A spark-ignition-type internal combustion engine as claimed in claim 4, in which said one end portion of said passage is the portion between said main combustion chamber and said intermediate portion.

6. A spark-ignition-type internal combustion engine as claimed in claim 4, in which said one end portion of said passage is the portion between said auxiliary combustion chamber and said intermediate portion.

7. A spark-ignition-type internal combustion engine as claimed in claim 6 wherein the other end portion of said passage tapers in a direction toward said one end portion.

8. A spark-ignition-type internal combustion engine as claimed in claim 1 in which said passage is defined by a peripheral wall having an outwardly offset wall portion, or a recess, defining in conjunction with the remainder of the passage said first portion of enlarged cross-sectional area, the electrodes of said spark plug being entirely disposed within said offset portion or said recess, outside of the remainder of the passage and spaced inwardly from the passage wall.

9. A spark-ignition-type internal combustion engine as claimed in claim 4, in which both end portions of said passage are of smaller cross-sectional area than said intermediate portion and wherein said electrodes are positioned entirely within said first portion of enlarged cross-sectional area of said passage.

10. A spark-ignition-type internal combustion engine as claimed in claim 6, in which said intermediate portion and said one end portion extend at an angle to each other and the spark plug electrodes are located on the outside of the included angle defined by the axes of said portions.

11. A spark-ignition-type internal combustion engine according to claim 1, wherein the wall of said transfer passage includes a first wall portion which comprises one of the boundaries of said first passage portion, the wall of said passage including a second wall portion which defines one of the boundaries of said additional passage portion, said additional passage portion being located between said first passage portion and said auxiliary combustion chamber, said second wall portion being offset inwardly from the first wall portion so as to be in closer positional relationship with respect to the longitudinally extending centerline of the transfer passage, and the wall of said transfer passage including an intermediate wall portion which extends transversely between and joins said first and second wall portions, said intermediate wall portion defining a shoulder which is disposed directly downstream of said electrodes when the flow occurs through the passage in a direction from the main combustion chamber into the auxiliary combustion chamber.

* * * * *